United States Patent
Hamamoto et al.

(10) Patent No.: US 10,208,861 B2
(45) Date of Patent: Feb. 19, 2019

(54) SEALING DEVICE

(71) Applicant: NOK CORPORATION, Tokyo (JP)

(72) Inventors: Kokichi Hamamoto, Fukushima (JP); Takehiro Nakagawa, Fukushima (JP); Hideaki Nagahamaya, Fukushima (JP); Shiho Sato, Fukushima (JP)

(73) Assignee: NOK CORPORATION, Tokyo (JP)

( * ) Notice: Subject to any disclaimer, the term of this patent is extended or adjusted under 35 U.S.C. 154(b) by 144 days.

(21) Appl. No.: 15/311,926

(22) PCT Filed: May 15, 2015

(86) PCT No.: PCT/JP2015/063971
§ 371 (c)(1),
(2) Date: Nov. 17, 2016

(87) PCT Pub. No.: WO2015/178292
PCT Pub. Date: Nov. 26, 2015

(65) Prior Publication Data
US 2017/0122438 A1 May 4, 2017

(30) Foreign Application Priority Data

May 20, 2014 (JP) .................................. 2014-104302
Aug. 26, 2014 (JP) .................................. 2014-171784

(51) Int. Cl.
*F16J 15/3232* (2016.01)
*F16J 15/32* (2016.01)
(Continued)

(52) U.S. Cl.
CPC ........... *F16J 15/3232* (2013.01); *F16J 15/32* (2013.01); *F16J 15/322* (2013.01);
(Continued)

(58) Field of Classification Search
CPC .... F16J 15/3232; F16J 15/3236; F16J 15/025; F16J 15/3204; F16J 15/32; F16J 15/322;
(Continued)

(56) References Cited

U.S. PATENT DOCUMENTS 5,577,741 A * 11/1996 Sink ..................... F16J 15/3252
277/559
5,649,710 A * 7/1997 Kanda .................. F16J 15/3256
277/371

(Continued)

FOREIGN PATENT DOCUMENTS

EP 3211278 A1 8/2017
JP S57-051870 U 3/1982
(Continued)

OTHER PUBLICATIONS

Extended European Search Report dated Jan. 29, 2018 (corresponding to EP 15796984.1).

*Primary Examiner* — Nathan Cumar
(74) *Attorney, Agent, or Firm* — Harness, Dickey & Pierce, P.L.C.

(57) ABSTRACT

A sealing device capable of preventing turnover of a dust lip and damage to a dust lip caused by insertion of a shaft. A bumper portion (125) made of a rubber-like elastic body and reducing an impact that the dust lip (122) receives from the shaft when the shaft is inserted into the sealing device (100) is provided on the side opposite to the sealed area (O) with respect to the dust lip (122), and an inner diameter of a tip of the bumper portion (125) on an inner peripheral side is set to be larger than an outer diameter of a part of the shaft on which a main lip (121) and the dust lip (122) slide and to be smaller than an inner diameter of a part having the largest inner diameter in a portion connecting the main lip (121) and the dust lip (122).

4 Claims, 14 Drawing Sheets

(51) Int. Cl.
*F16J 15/322* (2016.01)
*F16J 15/3224* (2016.01)
*F16J 15/3244* (2016.01)
*F16J 15/3252* (2016.01)
*F16J 15/3276* (2016.01)

(52) U.S. Cl.
CPC ....... *F16J 15/3224* (2013.01); *F16J 15/3244* (2013.01); *F16J 15/3252* (2013.01); *F16J 15/3276* (2013.01)

(58) Field of Classification Search
CPC .. F16J 15/3224; F16J 15/3244; F16J 15/3252; F16J 15/3276
USPC ......................................................... 277/572
See application file for complete search history.

(56) References Cited

U.S. PATENT DOCUMENTS

2002/0079650 A1* 6/2002 Hosoda ................ F16J 15/3216
277/549
2014/0054864 A1 2/2014 Kohl et al.

FOREIGN PATENT DOCUMENTS

| JP | H04-128576 U | 11/1992 |
| JP | H07-032260 U | 6/1995 |
| JP | 2000 039073 * | 2/2000 |
| JP | 2000-039073 A | 2/2000 |
| JP | 3359462 B2 | 12/2002 |
| JP | 2005-233218 A | 9/2005 |

* cited by examiner

SEALING DEVICE

CROSS-REFERENCE TO RELATED APPLICATIONS

This application is a National Stage of International Application No. PCT/JP2015/063971, filed May 15, 2015 (now WO 2015/178292A1), which claims priority to Japanese Application No. 2014-104302, filed May 20, 2014 and Japanese Application No. 2014-171784, filed Aug. 26, 2014. The entire disclosures of each of the above applications are incorporated herein by reference.

FIELD

The present disclosure relates to a sealing device that seals an annular gap between a shaft and a housing.

BACKGROUND

Conventionally, there is known a sealing device such as an oil seal that includes a main lip that prevents leakage of a target liquid to be sealed such as oil, and a dust lip that prevents intrusion of a foreign object such as dust into a sealed area from the outside. With this sealing device, it is possible to seal an annular gap between a shaft and a housing.

In the sealing device, the tip of the shaft hits the dust lip when the shaft is inserted into the sealing device, whereby there are cases where the dust lip is turned over or damaged. This respect will be described with reference to FIG. 14. FIG. 14 is a schematic cross-sectional view of the sealing device of a conventional example. FIG. 14 shows a state when the shaft is inserted into the sealing device.

A sealing device 500 shown in the drawing includes a reinforcing ring 510, and a seal main body 520 made of a rubber-like elastic body that is provided integrally with the reinforcing ring 510. In addition, the seal main body 520 integrally includes a main lip 521, a dust lip 522, a side lip 523, and an outer peripheral sealed portion 524. According to the sealing device 500, it is possible to prevent leakage of the target liquid to be seal to the side of the dust lip 522 using the main lip 521, and prevent intrusion of a foreign object to the side of the main lip 521 using the dust lip 522. In the sealing device 500, when the sealing device 500 is assembled, a shaft 200 is inserted from the side of the dust lip 522 to the side of the main lip 521 (a direction of an arrow A in the drawing). At this point, the tip of the shaft 200 hits the dust lip 522, whereby there are cases where the dust lip 522 is turned over or damaged.

Note that a technique for solving the above problem is also known (see PTLs 1 to 4). However, in the technique disclosed in PTL 1, a protector for protecting the dust lip is made of metal, and hence there is a possibility that the shaft itself is damaged. In the case of the technique disclosed in PTL 2, when the shaft hits a guide ring, the base of the dust lip is pushed by the guide ring so that there is a possibility that the dust lip is significantly deformed. Note that the guide ring disclosed in PTL 2 is provided not for preventing the shaft from hitting the dust lip when the shaft is inserted originally. Further, in the case of the techniques disclosed in PTLs 3 and 4, the inner diameter of a protection member (guide member, protector) for protecting the dust lip is configured to be smaller than the outer diameter of the shaft, and the protection member is configured to come into contact with the shaft. Accordingly, there is a possibility that an insertion force required to insert the shaft is uselessly increased, or deformation of the protection member itself causes a problem. Thus, there is yet room for improvement.

CITATION LIST

Patent Literature

[PTL 1] Japanese Utility Model Application Publication No. H7-32260
[PTL 2] Japanese Patent Application Laid-open No. 2000-39073
[PTL 3] Japanese Patent No. 3359462
[PTL 4] Japanese Utility Model Application Publication No. H4-128576

SUMMARY

Technical Problem

An object of the present disclosure is to provide a sealing device capable of preventing the turnover of the dust lip and the damage to the dust lip that are caused by the insertion of the shaft.

Solution to Problem

The present disclosure has adopted the following means in order to solve the above problem.

That is, the sealing device according to the present disclosure is a sealing device sealing an annular gap between a shaft and a housing, including: a reinforcing ring having an inward flange portion; and a seal main body made of a rubber-like elastic body, provided integrally with the reinforcing ring, and having a main lip that extends from a vicinity of a tip of the inward flange portion to a sealed area side, and slidably comes into contact with an outer peripheral surface of the shaft, and a dust lip that extends from the vicinity of the tip of the inward flange portion to a side opposite to the sealed area, and slidably comes into contact with the outer peripheral surface of the shaft, wherein a bumper portion made of a rubber-like elastic body and reducing an impact that the dust lip receives from the shaft when the shaft is inserted into the sealing device is provided on the side of the dust lip opposite to the sealed area, and an inner diameter of a tip of the bumper portion on an inner peripheral side is set to be larger than an outer diameter of a part of the shaft on which the main lip and the dust lip slide and to be smaller than an inner diameter of a part having the largest inner diameter in a portion connecting the main lip and the dust lip.

According to the present disclosure, since the bumper portion is provided, the tip of the shaft is prevented from hitting the dust lip when the shaft is inserted into the sealing device. In addition, since the bumper portion is made of the rubber-like elastic body, even when the shaft hits the bumper portion, the shaft is prevented from being damaged. Further, since the main lip and the dust lip are configured to extend from the vicinity of the tip of the inward flange portion in the reinforcing ring, even when the tip of the shaft hits the bumper portion and the bumper portion is thereby pushed, the main lip and the dust lip are not significantly deformed. In addition, since the inner diameter of the tip of the bumper portion on the inner peripheral side is larger than the outer diameter of the part of the shaft on which the main lip and the dust lip slide, it is possible to prevent an insertion force required to insert the shaft from being uselessly increased, and prevent deformation of the bumper portion. Further, since the inner diameter of the tip of the bumper portion on the inner peripheral side is smaller than the inner diameter of the part having the largest inner diameter in the portion connecting the main lip and the dust lip, even when the tip of the shaft hits the bumper portion and the bumper portion is thereby pushed, it is possible to effectively prevent the dust lip from being significantly deformed.

In addition, another sealing device of the present disclosure is a sealing device sealing an annular gap between a shaft and housing, including: a reinforcing ring having an inward flange portion; and a seal main body made of a rubber-like elastic body, provided integrally with the reinforcing ring, and having a main lip that extends from a vicinity of a tip of the inward flange portion to a sealed area side, and slidably comes into contact with an outer peripheral surface of the shaft, and a dust lip that extends from the vicinity of the tip of the inward flange portion to a side opposite to the sealed area, and slidably comes into contact with the outer peripheral surface of the shaft, wherein a bumper portion made of a rubber-like elastic body and reducing an impact that the dust lip receives from the shaft when the shaft is inserted into the sealing device is provided on the side of the dust lip opposite to the sealed area, and a guide made of resin and guiding the shaft into the sealing device is provided on an inner peripheral side of the bumper portion on the side opposite to the sealed area, and an inner diameter of a tip of the guide on the inner peripheral side is set to be larger than an outer diameter of a part of the shaft on which the main lip and the dust lip slide and to be smaller than an inner diameter of a part having the largest inner diameter in a portion connecting the main lip and the dust lip.

According to the present disclosure, since the bumper portion is provided, the tip of the shaft is prevented from hitting the dust lip when the shaft is inserted into the sealing device. In addition, since the guide made of resin is provided on the inner peripheral side of the bumper portion on the side opposite to the sealed area, an insertion property (slipperiness) of the shaft is improved. With this, it is possible to prevent the insertion force required to insert the shaft from being uselessly increased, and prevent the deformation of the bumper portion. In addition, even when the position of the shaft is displaced in a radial direction at the time of insertion of the shaft (even when a misalignment occurs), the tip of the shaft hits the guide, and hence the bumper portion is prevented from being damaged. Further, since the guide is made of resin, even when the shaft hits the guide, the shaft is prevented from being damaged. In addition, since the main lip and the dust lip are configured to extend from the vicinity of the tip of the inward flange portion in the reinforcing ring, even when the tip of the shaft hits the guide and the bumper portion is thereby pushed together with the guide, the main lip and the dust lip are not significantly deformed. Further, since the inner diameter of the tip of the guide on the inner peripheral side is larger than the outer diameter of the part of the shaft on which the main lip and the dust lip slide, it is possible to prevent the insertion force required to insert the shaft from being uselessly increased, and prevent the deformation of the guide and the bumper portion. In addition, since the inner diameter of the tip of the guide on the inner peripheral side is smaller than the inner diameter of the part having the largest inner diameter in the portion connecting the main lip and the dust lip, even when the tip of the shaft hits the guide and the guide is thereby pushed, it is possible to effectively prevent the dust lip from being significantly deformed.

The bumper portion may be constituted by part of the seal main body. With this, it is not necessary to increase the number of components.

The seal main body may be provided with a thick portion on the side of the inward flange portion opposite to the sealed area, and an inner peripheral side of the thick portion may be constituted by the bumper portion.

With this, even when the shaft hits the bumper portion, it is possible to prevent the deformation of the bumper portion.

Advantageous Effects of the Disclosure

As described thus far, according to the present disclosure, it is possible to prevent the turnover of the dust lip and the damage to the dust lip that are caused by the insertion of the shaft.

DRAWINGS

DETAILED DESCRIPTION

Hereinbelow, with reference to the drawings, an embodiment of the present disclosure will be illustratively described in detail based on Examples. However, the scope of the present disclosure is not limited only to dimensions, materials, shapes, and relative arrangements of constituent parts described in Examples unless specifically described. Note that, in the present Examples, the case of an oil seal that prevents leakage of oil will be described as an example of a sealing device.

Example 1

Figure 1:
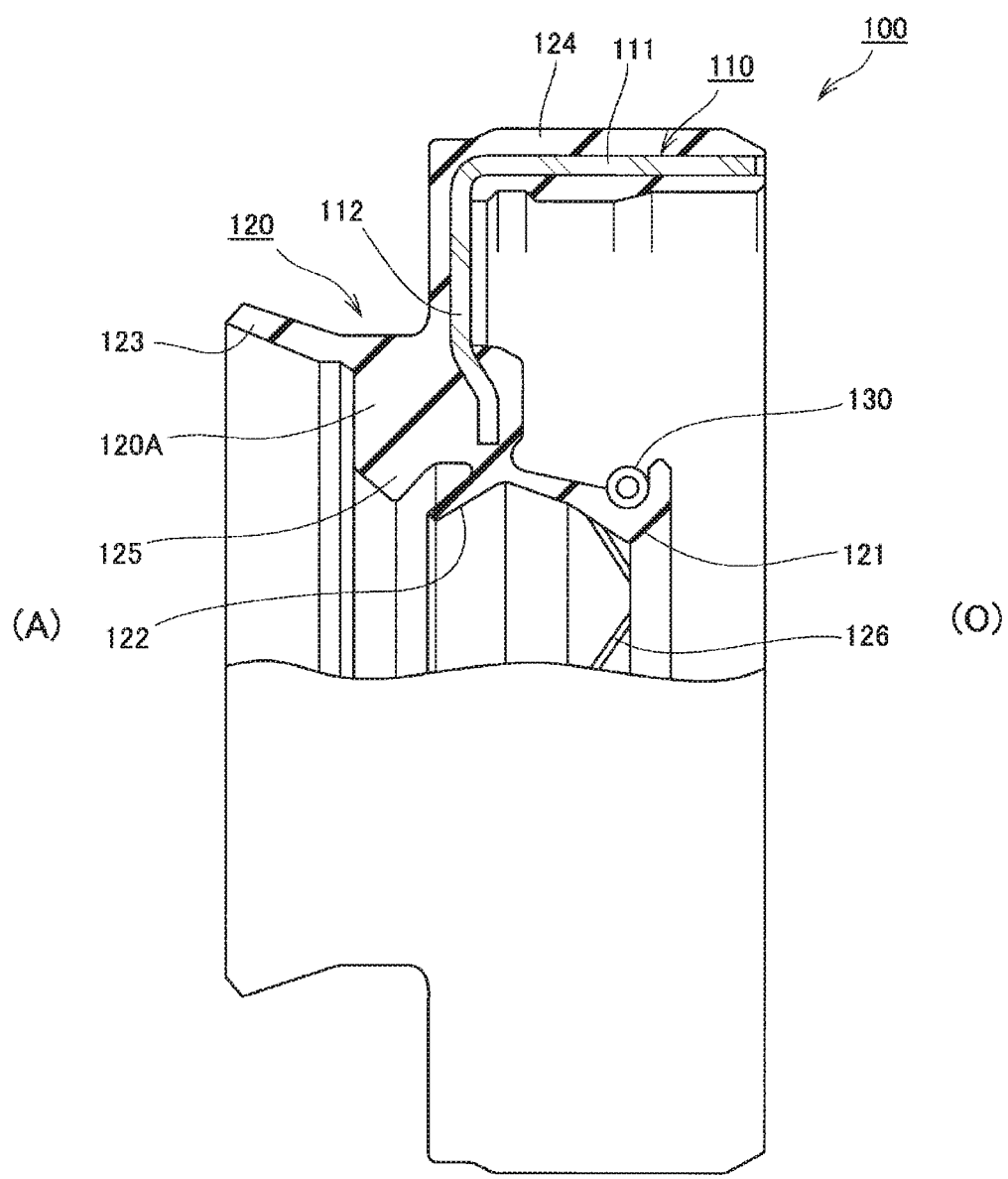
FIG. 1 is a partially cutaway cross-sectional view of a sealing device according to Example 1 of the present disclosure.
Figure 2:
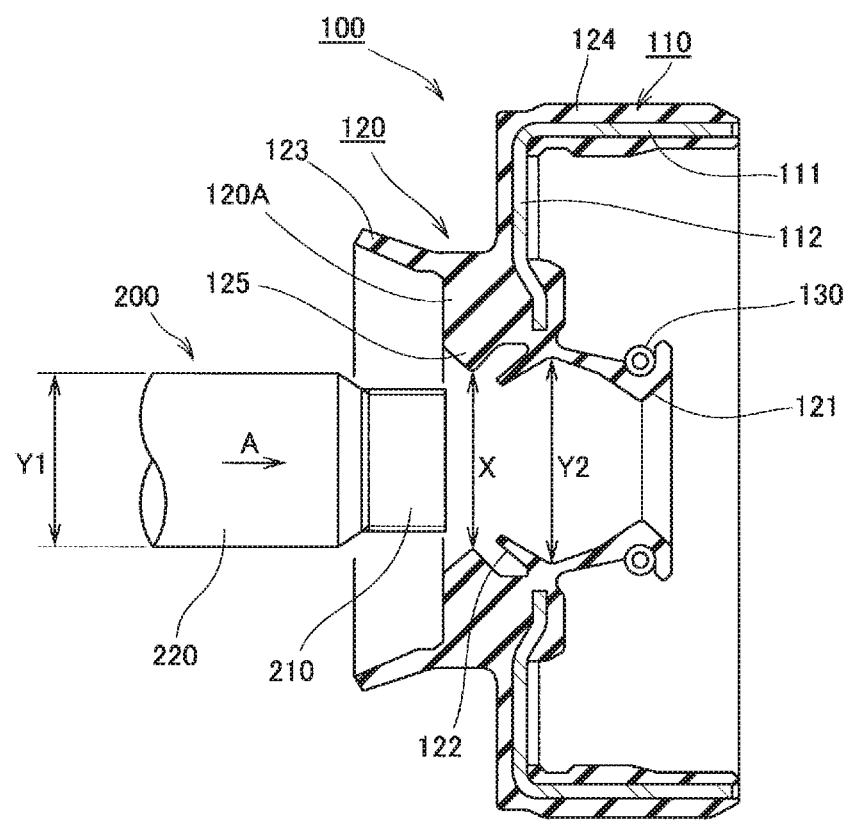
FIG. 2 is a schematic cross-sectional view showing a state when a shaft is inserted into the sealing device according to Example 1 of the present disclosure.
Figure 3:
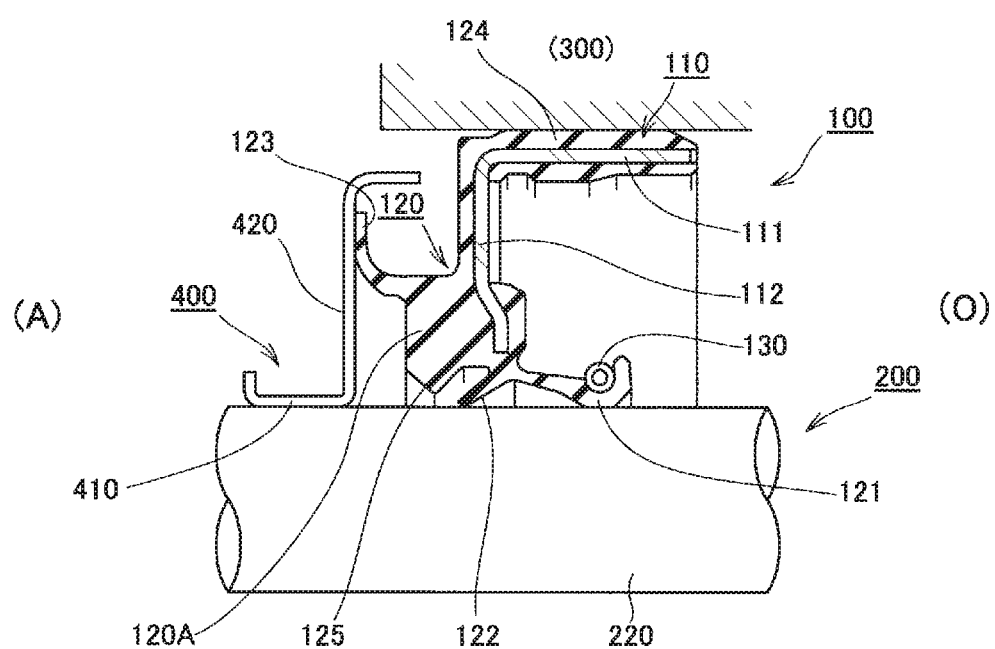
FIG. 3 is a schematic cross-sectional view showing a state when the sealing device according to Example 1 of the present disclosure is used.

With reference to FIGS. 1 to 3, a sealing device according to Example 1 of the present disclosure will be described.

FIG. 1 is a partially cutaway cross-sectional view of the sealing device according to Example 1 of the present disclosure. Note that the drawing of the cross-sectional part in FIG. 1 is a cross-sectional view of a cross section obtained by cutting by using a plane including the central axis in the sealing device. FIG. 2 is a schematic cross-sectional view showing a state when a shaft is inserted into the sealing device according to Example 1 of the present disclosure. Note that, in FIG. 2, a depth line is appropriately omitted for the convenience of description in the cross-sectional view of the sealing device. FIG. 3 is a schematic cross-sectional view showing a state when the sealing device according to Example 1 of the present disclosure is used. The cross-sectional view of the sealing device in each of FIGS. 2 and 3 shows a cross section obtained by cutting by using a plane including the central axis in the sealing device.

<Configuration of Sealing Device>

The configuration of a sealing device 100 according to the present Example will be described with reference to particularly FIG. 1. Note that the sealing device 100 according to the present Example plays a role in sealing an annular gap between a shaft 200 and a housing 300 (see FIG. 3). The sealing device 100 is constituted by a metal reinforcing ring 110, and a seal main body 120 made of a rubber-like elastic body that is provided integrally with the reinforcing ring 110. In the sealing device 100, the right side in the drawing corresponds to a sealed area side (O) in which a target liquid to be sealed is sealed, and the left side in the drawing corresponds to an air side (A) opposite to the sealed area when the sealing device 100 is used. Note that, in the present Example, the target liquid to be sealed is oil.

The reinforcing ring 110 has a cylindrical portion 111, and an inward flange portion 112 that extends from the end portion of the cylindrical portion 111 on the air side (A) inwardly in a radial direction.

The seal main body 120 integrally has a main lip 121, a dust lip 122, a side lip 123, an outer peripheral seal portion 124, and a bumper portion 125. Note that the seal main body 120 can be obtained by insert molding with the reinforcing ring 110 used as an insert component. The main lip 121 is configured to extend from the vicinity of the tip of the inward flange portion 112 to the sealed area side (O) and slidably come into contact with the outer peripheral surface of the shaft 200. To the outer periphery of the main lip 121, a spring 130 that presses the main lip 121 inwardly in the radial direction is mounted. In addition, in the inner peripheral surface of the main lip 121, a screw portion 126 that exerts a function of returning the target liquid to be sealed to the sealed area side (O) with rotation of the shaft 200 is provided. The thus configured main lip 121 plays a role in preventing the leakage of the target liquid to be sealed to the air side (A).

The dust lip 122 is configured to extend from the vicinity of the tip of the inward flange portion 112 to the air side (A) and slidably come into contact with the outer peripheral surface of the shaft 200. The dust lip 122 plays a role in preventing intrusion of a foreign object such as dust from the outside (the air side (A)) to the sealed area side (O). Herein, in the seal main body 120, a thick portion 120A is provided on the air side (A) of the inward flange portion 112. The side lip 123 is provided so as to extend from the outer peripheral side of the thick portion 120A to the air side (A). The outer peripheral seal portion 124 is provided so as to cover the outer peripheral surface of the cylindrical portion 111. Further, the inner peripheral portion of the thick portion 120A is constituted by the bumper portion 125. The bumper portion 125 plays a role in reducing an impact that the dust lip 122 receives from the shaft 200 when the shaft 200 is inserted into the sealing device 100.

<Detail of Bumper Portion>

The bumper portion 125 will be described in greater detail with reference to particularly FIG. 2. The shaft 200 according to the present Example is a spline shaft that rotates during its use. The shaft 200 is a stepped shaft that includes a small diameter portion 210 formed with a plurality of grooves and a large diameter portion 220 having an outer diameter larger than that of the small diameter portion 210. Note that, during the use, the main lip 121 and the dust lip 122 slide relative to the large diameter portion 220. The thus configured shaft 200 is inserted into the sealing device 100 from the side of the small diameter portion 210. In addition, the shaft 200 is inserted from the air side (A) to the sealed area side (O), i.e., from the side of the dust lip 122 to the side of the main lip 121 (a direction of an arrow A in the drawing).

An inner diameter X of the tip of the bumper portion 125 according to the present Example on the inner peripheral side is set to be larger than an outer diameter Y1 of a part of the shaft 200 on which the main lip 121 and the dust lip 122 slide (i.e., the large diameter portion 220). In addition, the inner diameter X is set to be smaller than an inner diameter Y2 of a part having the largest inner diameter in a portion that connects the main lip 121 and the dust lip 122. That is, the inner diameter X, the outer diameter Y1, and the inner diameter Y2 are set so as to satisfy Y1<X<Y2. Note that the part having the largest inner diameter in the portion that connects the main lip 121 and the dust lip 122 corresponds to a portion of the base of the main lip 121 and also corresponds to a portion of the base of the dust lip 122. Further, as a more specific example, the inner diameter X of the tip of the bumper portion 125 on the inner peripheral side can be set to be larger than the outer diameter Y1 of the large diameter portion 220 by a length of not less than 0.2 mm and not more than 2.0 mm.

<In-Use State of Sealing Device>

The in-use state of the sealing device 100 according to the present Example will be described with reference to particularly FIG. 3. As described above, the sealing device 100 according to the present Example plays the role in sealing the annular gap between the shaft 200 and the housing 300. That is, the outer peripheral seal portion 124 in the sealing device 100 comes into intimate contact with the inner peripheral surface of a shaft hole of the housing 300, and the gap between the sealing device 100 and the housing 300 is thereby sealed. In addition, the main lip 121 and the dust lip 122 in the sealing device 100 slidably come into contact with the outer peripheral surface of the large diameter portion 220 of the shaft 200, and the gap between the sealing device 100 and the shaft 200 is thereby sealed.

In addition, in the present Example, a metal slinger 400 is mounted to the shaft 200. The slinger 400 includes a cylindrical portion 410 that is fitted on the shaft 200, and an outward flange portion 420 that extends from the end portion of the cylindrical portion 410 on the sealed area side (O) outwardly in the radial direction. Further, the side lip 123 in the sealing device 100 is configured to slidably come into contact with the outward flange portion 420 in the slinger 400. With this, even in an environment in which muddy water or the like splashes, it is possible to prevent the intrusion of the foreign object to the sealed area side (O).

<Advantages of Sealing Device According to Present Example>

According to the thus configured sealing device 100 according to the present Example, since the bumper portion 125 is provided, the tip of the shaft 200 is prevented from hitting the dust lip 122 when the shaft 200 is inserted into the sealing device 100. In addition, since the bumper portion 125 is made of the rubber-like elastic body, even when the shaft 200 hits the bumper portion 125, the shaft 200 is prevented from being damaged. Further, the main lip 121 and the dust lip 122 are configured to extend from the vicinity of the tip of the inward flange portion 112 in the reinforcing ring 110. Consequently, even when the tip of the shaft 200 hits the bumper portion 125 and the bumper portion 125 is thereby pushed, the inward flange portion 112 is hardly deformed, and hence the main lip 121 and the dust lip 122 are not significantly deformed.

In addition, the inner diameter X of the tip of the bumper portion 125 on the inner peripheral side is larger than the outer diameter Y1 of the part of the shaft 200 on which the main lip 121 and the dust lip 122 slide (i.e., the large diameter portion 220). Consequently, it is possible to prevent an insertion force required to insert the shaft 200 from being uselessly increased, and prevent the deformation of the bumper portion 125. Further, the inner diameter X of the tip of the bumper portion 125 on the inner peripheral side is smaller than the inner diameter Y2 of the part having the largest inner diameter in the portion that connects the main lip 121 and the dust lip 122. Consequently, even when the tip of the shaft 200 hits the bumper portion 125 and the bumper portion 125 is thereby pushed, it is possible to effectively prevent the dust lip 122 from being significantly deformed. That is, in the case where the tip of the shaft 200 hits a portion of the dust lip 122 positioned outwardly of the portion of the base of the dust lip 122 in the radial direction, there is a possibility that the dust lip 122 cannot be deformed so as to bend and is permanently deformed. In contrast to this, according to the sealing device 100 according to the present Example, since the dimensional relationship described above is satisfied, the tip of the shaft 200 is prevented from hitting the portion of the dust lip 122 positioned outwardly of the portion of the base of the dust lip 122 in the radial direction.

In addition, in the present Example, the bumper portion 125 is constituted by part of the seal main body 120. With this, it is not necessary to increase the number of components in order to provide the bumper portion 125.

Further, in the present Example, in the seal main body 120, the thick portion 120A is provided on the air side (A) of the inward flange portion 112 in the reinforcing ring 110, and the inner peripheral side of the thick portion 120A is constituted by the bumper portion 125. With this, even when the shaft 200 hits the bumper portion 125, it is possible to prevent the deformation of the bumper portion 125.

Example 2

Figure 4:
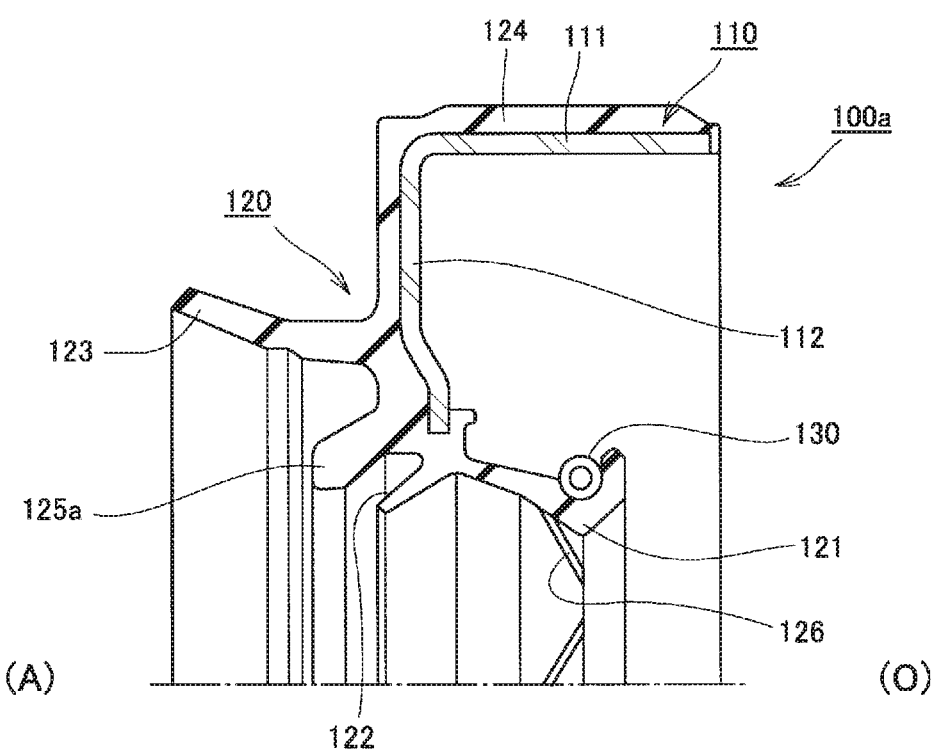
FIG. 4 is a schematic cross-sectional view of a sealing device according to Example 2 of the present disclosure.

FIG. 4 shows Example 2 of the present disclosure. In the present Example, the configuration of the case where the shape of the bumper portion is different from that in Example 1 is described. The other constituent parts and operations are the same as those in Example 1 so that the same constituent parts are designated by the same reference numerals as those in Example 1, and the description thereof will be omitted.

FIG. 4 is a schematic cross-sectional view of a sealing device according to Example 2 of the present disclosure. Note that FIG. 4 shows a cross section of the sealing device obtained by cutting by using the plane including the central axis in the sealing device. Similarly to the case of Example 1 described above, a sealing device 100a according to the present Example is also constituted by the metal reinforcing ring 110 and the seal main body 120 made of the rubber-like elastic body that is provided integrally with the reinforcing ring 110. In the sealing device 100a as well, similarly to the case of Example 1, the right side in the drawing corresponds to the sealed area side (O) in which the target liquid to be sealed is sealed, and the left side in the drawing corresponds to the air side (A) opposite to the sealed area when the sealing device 100a is used.

The configuration of the reinforcing ring 110 is the same as that of the case of Example 1 described above, and hence the description thereof will be omitted. The configuration of the seal main body 120 is the same as that of the case of Example 1 described above except the configuration related to a bumper portion 125a. Consequently, hereinbelow, only the configuration related to the bumper portion 125a will be described.

In the sealing device 100a according to the present Example, unlike the case of the sealing device 100 described in Example 1 described above, the thick portion 120A of the case of Example 1 is not provided on the air side (A) of the inward flange portion 112 in the seal main body 120. In the case of the present Example, the lip-shaped bumper portion 125a is provided so as to extend from a middle portion between the dust lip 122 and the side lip 123 to the air side (A) inwardly in the radial direction. The dimensional relationship among the inner diameter of the tip of the bumper portion 125a on the inner peripheral side, the outer diameter of the large diameter portion 220 of the shaft 200 described in Example 1 described above, and the inner diameter of the part having the largest inner diameter in the portion that connects the main lip 121 and the dust lip 122 is the same as that of the case of Example 1 described above.

Thus, the sealing device 100a according to the present Example is different from the sealing device 100 according to Example 1 only in that, unlike Example 1 in which the inner peripheral portion of the thick portion 120A is constituted by the bumper portion 125, the lip-shaped bumper portion 125a is provided in the present Example. In the thus configured sealing device 100a as well, it is possible to obtain the same effects as those of the case of Example 1 described above. Note that, in the case of the present Example, since the bumper portion 125a is lip-shaped, in the case where the shaft 200 hits the bumper portion 125a, the bumper portion 125a is deformed easily as compared with the case of Example 1 described above. However, it is possible to reduce the material of the rubber-like elastic body correspondingly to the absence of the thick portion 120A, and achieve a reduction in weight.

Example 3

Figure 5:
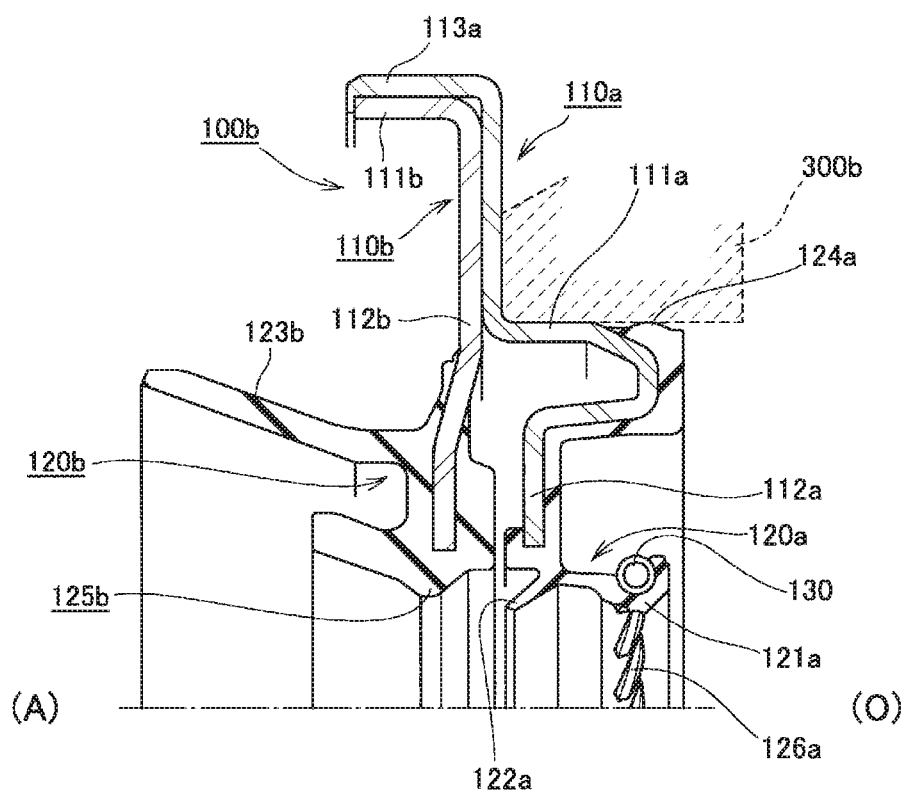
FIG. 5 is a schematic cross-sectional view of a sealing device according to Example 3 of the present disclosure.

FIG. 5 shows Example 3 of the present disclosure. FIG. 5 is a schematic cross-sectional view of a sealing device according to Example 3 of the present disclosure. Note that FIG. 5 shows a cross section of the sealing device obtained by cutting by using the plane including the central axis in the sealing device.

A sealing device 100b according to the present Example also plays the role in sealing the annular gap between the shaft and a housing 300b. In the sealing device 100b as well, the right side in the drawing corresponds to the sealed area side (O) in which the target liquid to be sealed is sealed, and the left side in the drawing corresponds to the air side (A) opposite to the sealed area side when the sealing device 100b is used. Note that, in FIG. 5, the shaft is not shown, and the housing 300b is depicted by using a dotted line.

The sealing device 100b according to the present Example includes a metal reinforcing ring 110a and a seal main body 120a made of the rubber-like elastic body that is provided integrally with the reinforcing ring 110a.

The reinforcing ring 110a has a cylindrical portion 111a that is fitted in the inner peripheral surface of the shaft hole of the housing 300b, and an inward flange portion 112a that extends inwardly in the radial direction from the end portion of the cylindrical portion 111a on the air side (A) after the cylindrical portion 111a is bent into a substantially U-shape at the end portion thereof on the sealed area side (O).

The seal main body 120a integrally has a main lip 121a, a dust lip 122a, and an outer peripheral seal portion 124a. Note that the seal main body 120a can be obtained by insert molding by using the reinforcing ring 110a as the insert component. The main lip 121a is configured to extend from the vicinity of the tip of the inward flange portion 112a to the sealed area side (O) and slidably come into contact with the outer peripheral surface of the shaft. To the outer periphery of the main lip 121a, the spring 130 that presses the main lip 121a inwardly in the radial direction is mounted. In addition, in the inner peripheral surface of the main lip 121a, a screw portion 126a that exerts the function of returning the target liquid to be sealed to the sealed area side (O) with the rotation of the shaft is provided. The thus configured main lip 121a plays the role in preventing the leakage of the target liquid to be sealed to the air side (A).

The dust lip 122a is configured to extend from the vicinity of the tip of the inward flange portion 122a to the air side (A) and slidably come into contact with the outer peripheral surface of the shaft. The dust lip 122a plays the role in preventing the intrusion of the foreign object such as dust from the outside (the air side (A)) to the sealed area side (O). The outer peripheral seal portion 124a is provided so as to cover the outer peripheral portion of a part of the cylindrical portion 111a that is bent into the substantially U-shape at the end portion of the cylindrical portion 111a on the sealed area side (O).

In the sealing device 100b according to the present Example, an auxiliary reinforcing ring 110b that is fixed to the reinforcing ring 110a by fitting is provided. The auxiliary reinforcing ring 110b has a cylindrical portion 111b, and an inward flange portion 112b that extends from the end portion of the cylindrical portion 111b on the sealed area side (O) inwardly in the radial direction. The cylindrical portion 111b of the auxiliary reinforcing ring 110b is configured to be fitted in the inner peripheral surface of a cylindrical fitting portion 113a provided outwardly in the radial direction in the reinforcing ring 110a.

A rubber-like elastic body portion 120b is provided integrally with the auxiliary reinforcing ring 110b. The rubber-like elastic body portion 120b can be obtained by insert molding by using the auxiliary reinforcing ring 110b as the insert component. In addition, the rubber-like elastic body portion 120b integrally has a side lip 123b and a bumper portion 125b. The side lip 123b is provided on the air side (A) of the inward flange portion 112b of the auxiliary reinforcing ring 110b so as to extend to the air side (A). The bumper portion 125b is provided in the vicinity of the tip of the inward flange portion 112b. The bumper portion 125b plays the role in reducing the impact that the dust lip 122a receives from the shaft when the shaft is inserted into the sealing device 100b. The bumper portion 125b according to the present Example is constituted by a lip-shaped part that extends from a position located inwardly of the tip of the inward flange portion 112b in the radial direction to the air side (A) outwardly in the radial direction.

As described above, the sealing device 100b according to the present Example plays the role in sealing the annular gap between the shaft and the housing 300b. In the present example, the cylindrical portion 111a of the reinforcing ring 110a and the outer peripheral seal portion 124a in the sealing device 100b come into intimate contact with the inner peripheral surface of the shaft hole of the housing 300b, and the gap between the sealing device 100b and the housing 300b is thereby sealed. In addition, the main lip 121a and the dust lip 122a in the sealing device 100b slidably come into contact with the outer peripheral surface of the large diameter portion of the shaft, and the gap between the sealing device 100b and the shaft is thereby sealed.

In addition, in the present Example as well, although not shown in the drawing, the metal slinger is mounted to the shaft similarly to the case of Example 1, and the side lip 123b in the sealing device 100b is configured to slidably come into contact with the outward flange portion in the slinger. With this, even in the environment in which muddy water or the like splashes, it is possible to prevent the intrusion of the foreign object to the sealed area side (O).

Further, in the present Example as well, the dimensional relationship among the inner diameter of the tip of the bumper portion 125b on the inner peripheral side, the outer diameter of the large diameter portion 220 of the shaft 200 described in Example 1 described above, and the inner diameter of the part having the largest inner diameter in the portion that connects the main lip 121a and the dust lip 122a is the same as that of the case of Example 1 described above.

In the thus configured sealing device 100b as well, it is possible to obtain the same effects as those of the case of Example 1 described above. However, in the case of the present Example, the auxiliary reinforcing ring 110b is provided, and the side lip 123b and the bumper portion 125b are provided in the auxiliary reinforcing ring 110b. Consequently, as compared with the case of Example 1, the number of components is large. Note that, in the case of the sealing device 100b according to the present Example, the bumper portion 125b is constituted by the lip-shaped part that extends from the position located inwardly of the tip of the inward flange portion 112b in the radial direction to the air side (A) outwardly in the radial direction. With this, when the shaft hits the bumper portion 125b at the time of insertion of the shaft into the sealing device 100b, a function of guiding the shaft in a direction in which the central axis of the shaft matches the central axis of the sealing device 100b is exerted.

Example 4

Figure 6:
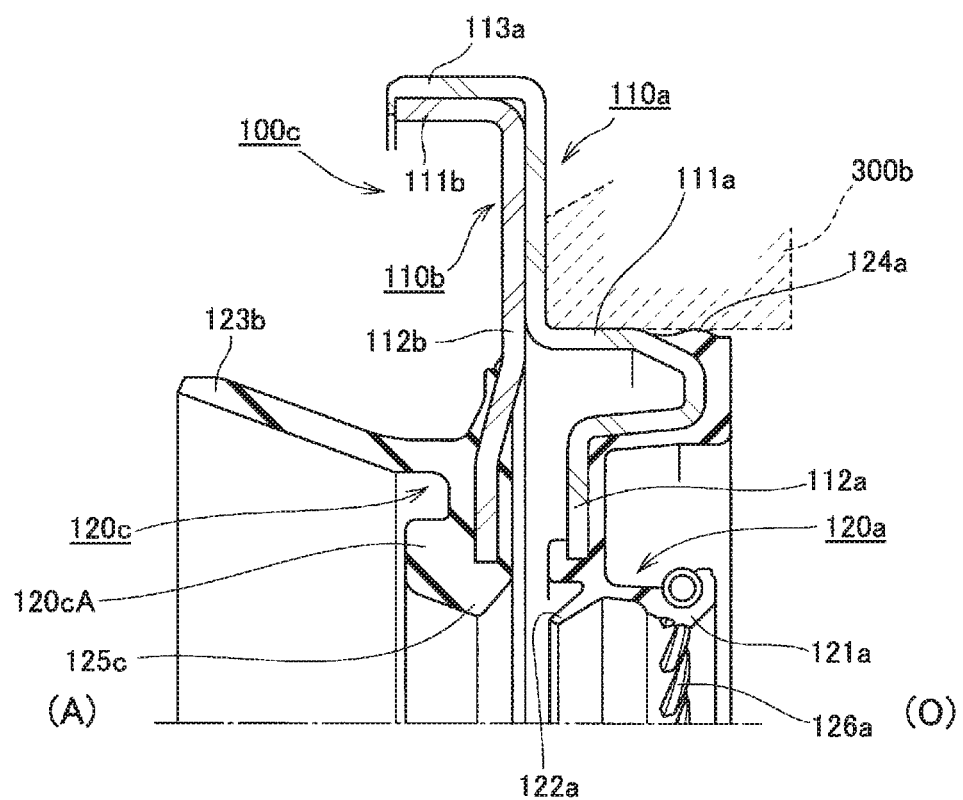
FIG. 6 is a schematic cross-sectional view of a sealing device according to Example 4 of the present disclosure.

FIG. 6 shows Example 4 of the present disclosure. In the present Example, the configuration of the case where the shape of the bumper portion is different from that in Example 3 described above is described. The other constituent parts and operations are the same as those in Example 3 so that the same constituent parts are designated by the same reference numerals as those in Example 3, and the description thereof will be omitted.

FIG. 6 is a schematic cross-sectional view of a sealing device according to Example 4 of the present disclosure. Note that FIG. 6 shows a cross section of the sealing device obtained by cutting by using the plane including the central axis in the sealing device. In a sealing device 100c according to the present Example as well, similarly to the case of each of Examples described above, the right side in the drawing corresponds to the seal area side (O) in which the target liquid to be sealed is sealed, and the left side in the drawing corresponds to the air side (A) opposite to the sealed area when the sealing device 100c is used. Similarly to the case of Example 3, the sealing device 100c according to the present Example also includes the metal reinforcing ring 110a and the seal main body 120a made of the rubber-like elastic body that is provided integrally with the reinforcing ring 110a. The configurations of the reinforcing ring 110a and the seal main body 120a are the same as those of the case of Example 3 described above, and hence the description thereof will be omitted.

In addition, similarly to the case of Example 3 described above, the sealing device 100c according to the present Example also includes the auxiliary reinforcing ring 110b and a rubber-like elastic body portion 120c that is provided integrally with the auxiliary reinforcing ring 110b. The configuration of the auxiliary reinforcing ring 110b is the same as that of the case of Example 3 described above, and hence the description thereof will be omitted. The configuration of the rubber-like elastic body portion 120c is the same as that of the case of Example 3 described above except the configuration related to a bumper portion 125c. Consequently, hereinbelow, only the configuration related to the bumper portion 125c will be described.

In the rubber-like elastic body portion 120c of the sealing device 100c according to the present Example, a thick portion 120cA is provided on the air side (A) of the inward portion 112b of the auxiliary reinforcing ring 110b. In addition, the inner peripheral portion of the thick portion 120cA is constituted by the bumper portion 125c.

Further, in the present Example as well, the dimensional relationship among the inner diameter of the tip of the bumper portion 125c on the inner peripheral side, the outer diameter of the large diameter portion 220 of the shaft 200 described in Example 1 described above, and the inner diameter of the part having the largest inner diameter in the portion that connects the main lip 121a and the dust lip 122a is the same as that of the case of each of Examples described above.

In the thus configured sealing device 100c as well, it is possible to obtain the same effects as those of the case of Example 3 described above. Note that, in the present Example, since the inner peripheral portion of the thick portion 120cA is constituted by the bumper portion 125c, an advantage is achieved that, even when the shaft hits the bumper portion 125c, the bumper portion 125c is less likely to be deformed as compared with the case of Example 3.

Example 5

Figure 7:
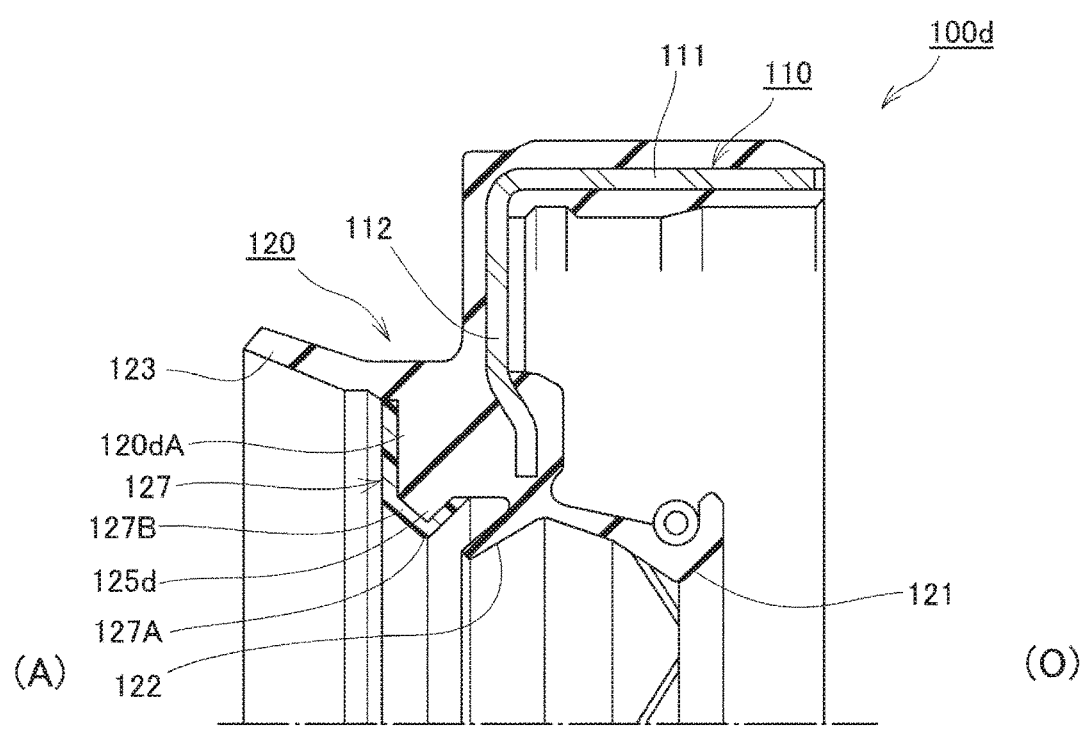
FIG. 7 is a schematic cross-sectional view of a sealing device according to Example 5 of the present disclosure.

FIG. 7 shows Example 5 of the present disclosure. The configuration of a sealing device according to the present Example is similar to that of the sealing device 100 according to Example 1 described above, but is different from that of the case of Example 1 in that a guide made of resin is provided in the bumper portion provided in the thick portion of the seal main body 120. Consequently, hereinbelow, only the configuration different from that of the case of Example 1 will be described. Note that the same constituent parts as those of the sealing device 100 according to Example 1 are designated by the same reference numerals as those in Example 1, and the description thereof will be omitted.

FIG. 7 is a schematic cross-sectional view of the sealing device according to Example 5 of the present disclosure. Note that FIG. 7 shows a cross section of the sealing device obtained by cutting by using the plane including the central axis in the sealing device. In a sealing device 100d according to the present Example as well, similarly to the case of each of Examples described above, the right side in the drawing corresponds to the sealed area side (O) in which the target liquid to be sealed is sealed, and the left side in the drawing corresponds to the air side (A) opposite to the sealed area when the sealing device 100d is used. Similarly to the case of Example 1 described above, the sealing device 100d according to the present Example is constituted by the metal reinforcing ring 110 and the seal main body 120 made of the rubber-like elastic body that is provided integrally with the reinforcing ring 110. The configuration of the reinforcing ring 110 is the same as that of the case of Example 1 described above. In addition, the configuration of the seal main body 120 is basically the same as that of the case of Example 1 described above, but the configuration related to the bumper portion is different from that of the case of Example 1.

In the seal main body 120 of the sealing device 100d according to the present Example, a thick portion 120dA is provided on the air side (A) of the inward flange portion 112 of the reinforcing ring 110, and the inner peripheral portion of the thick portion 120dA is constituted by a bumper portion 125d. In addition, on the inner peripheral side and the air side (A) of the bumper portion 125d, a guide 127 made of PTFE (polytetrafluoroethylene) as a fluorine resin is provided.

The annular guide 127 is bonded to the thick portion 120dA and the bumper portion 125d, and is constituted by an inner peripheral portion 127A that covers the inner peripheral side of the bumper portion 125d and a radial portion 127B that covers the air side (A) of the bumper portion 125d. Note that the radial portion 127B also covers the air side (A) of the thick portion 120dA. The inner diameter of the tip of the guide 127 according to the present Example on the inner peripheral side is set to be larger than the part of the shaft 200 on which the main lip 121 and the dust lip 122 slide (the outer diameter Y1 of the large diameter portion 220 shown in FIG. 2). In addition, the inner diameter thereof is set to be smaller than the inner diameter of the part having the largest inner diameter in the portion that connects the main lip 121 and the dust lip 122 (Y2 shown in FIG. 2).

According to the thus configured sealing device 100d, since the bumper portion 125d is provided, when the shaft 200 is inserted into the sealing device 100d, the tip of the shaft 200 is prevented from hitting the dust lip 122. In addition, in the present Example, the inner peripheral portion 127A of the guide 127 is provided on the inner peripheral side of the bumper portion 125d. The shaft 200 can slide relative to the inner peripheral portion 127A at the time of insertion of the shaft 200, and the guide 127 is formed of PTFE having a low frictional resistance. Consequently, an insertion property (slipperiness) of the shaft 200 is improved, and hence it is possible to prevent the insertion force required to insert the shaft 200 from being uselessly increased, and prevent the deformation of the bumper portion 125d. In addition, in the present Example, the radial portion 127B of the guide 127 is provided on the air side (A) of the bumper portion 125d. Consequently, even when the position of the shaft 200 is displaced in the radial direction at the time of insertion of the shaft 200 (even when a misalignment occurs), the tip of the shaft 200 hits the radial portion 127B, and hence the bumper portion 125d and the thick portion 120dA are prevented from being damaged. Further, since the guide 127 is made of PTFE, even when the shaft 200 hits the guide 127, the shaft 200 is prevented from being damaged. In addition, the main lip 121 and the dust lip 122 are configured to extend from the vicinity of the tip of the inward flange portion 112 in the reinforcing ring 110. Consequently, even when the tip of the shaft 200 hits the guide 127 and the bumper portion 125d is thereby pushed together with the guide 127, the inward flange portion 112 is hardly deformed, and hence the main lip 121 and the dust lip 122 are not significantly deformed.

In addition, the inner diameter of the tip of the guide 127 on the inner peripheral side is larger than the outer diameter of the large diameter portion 220 of the shaft 200. Consequently, it is possible to prevent the insertion force required to insert the shaft 200 from being uselessly increased, and prevent the deformation of the guide 127 and the bumper portion 125d. Further, the inner diameter of the tip of the guide 127 on the inner peripheral side is smaller than the inner diameter of the part having the largest inner diameter in the portion that connects the main lip 121 and the dust lip 122. Consequently, even when the tip of the shaft 200 hits the guide 127 and the guide 127 is thereby pushed, it is possible to effectively prevent the dust lip 122 from being significantly deformed.

Example 6

Figure 8:
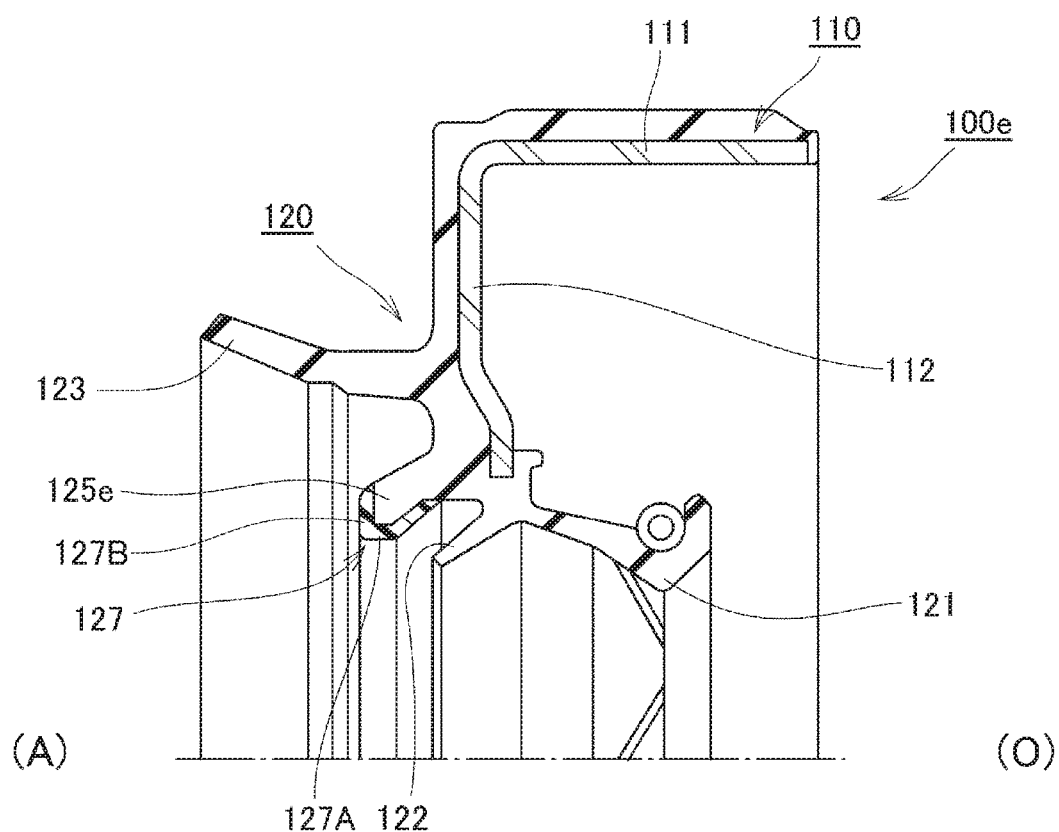
FIG. 8 is a schematic cross-sectional view of a sealing device according to Example 6 of the present disclosure.

FIG. 8 shows Example 6 of the present disclosure. The configuration of a sealing device according to the present Example is similar to that of the sealing device 100a according to Example 2 described above, but is different from that of the case of Example 2 in that the guide made of resin is provided in the bumper portion provided in the seal main body 120. Consequently, hereinbelow, only the configuration different from that of the case of Example 2 will be described. Note that the same constituent parts as those of the sealing device 100a according to Example 2 are designated by the same reference numerals as those in Example 2, and the description thereof will be omitted.

FIG. 8 is a schematic cross-sectional view of the sealing device according to Example 6 of the present disclosure. Note that FIG. 8 shows a cross section of the sealing device obtained by cutting by using the plane including the central axis in the sealing device. In a sealing device 100e as well, similarly to the case of Example 2, the right side in the drawing corresponds to the sealed area side (O) in which the target liquid to be sealed is sealed, and the left side in the drawing corresponds to the air side (A) opposite to the sealed area when the sealing device 100e is used. In addition, similarly to the sealing device 100a according to Example 2 described above, the sealing device 100e according to the present Example is constituted by the metal reinforcing ring 110 and the seal main body 120 made of the rubber-like elastic body that is provided integrally with the reinforcing ring 110. The configuration of the reinforcing ring 110 is the same as that of the case of Example 2 described above. In addition, the configuration of the seal main body 120 is basically the same as that of the case of Example 2 described above, but the configuration related to the bumper portion is different from that of the case of Example 2. Consequently, hereinbelow, only the configuration related to a bumper portion 125e will be described.

Similarly to the sealing device 100a described in Example 2 described above, in the seal main body 120 of the sealing device 100e according to the present Example, the lip-shaped bumper portion 125e is provided so as to extend from the middle portion between the dust lip 122 and the side lip 123 to the air side (A) inwardly in the radial direction. In addition, the guide 127 made of PTFE is provided on the inner peripheral side and the air side (A) of the bumper portion 125e. The guide 127 is bonded to the bumper portion 125e, and is constituted by the inner peripheral portion 127A that covers the inner peripheral side of the bumper portion 125e and the radial portion 127B that covers the air side (A) of the bumper portion 125e. In addition, the dimensional relationship among the inner diameter of the tip of the guide 127 on the inner peripheral side, the outer diameter of the large diameter portion 220 of the shaft 200, and the inner diameter of the part having the largest inner diameter in the portion that connects the main lip 121 and the dust lip 122 is the same as that of the case of Example 5 described above.

In the thus configured sealing device 100e as well, it is possible to obtain the same effects as those of the case of Example 5 described above. Note that, in the case of the sealing device 100e, similarly to Example 2 described above, it is possible to reduce the material of the rubber-like elastic body, and hence it is possible to achieve a reduction in weight.

Example 7

Figure 9:
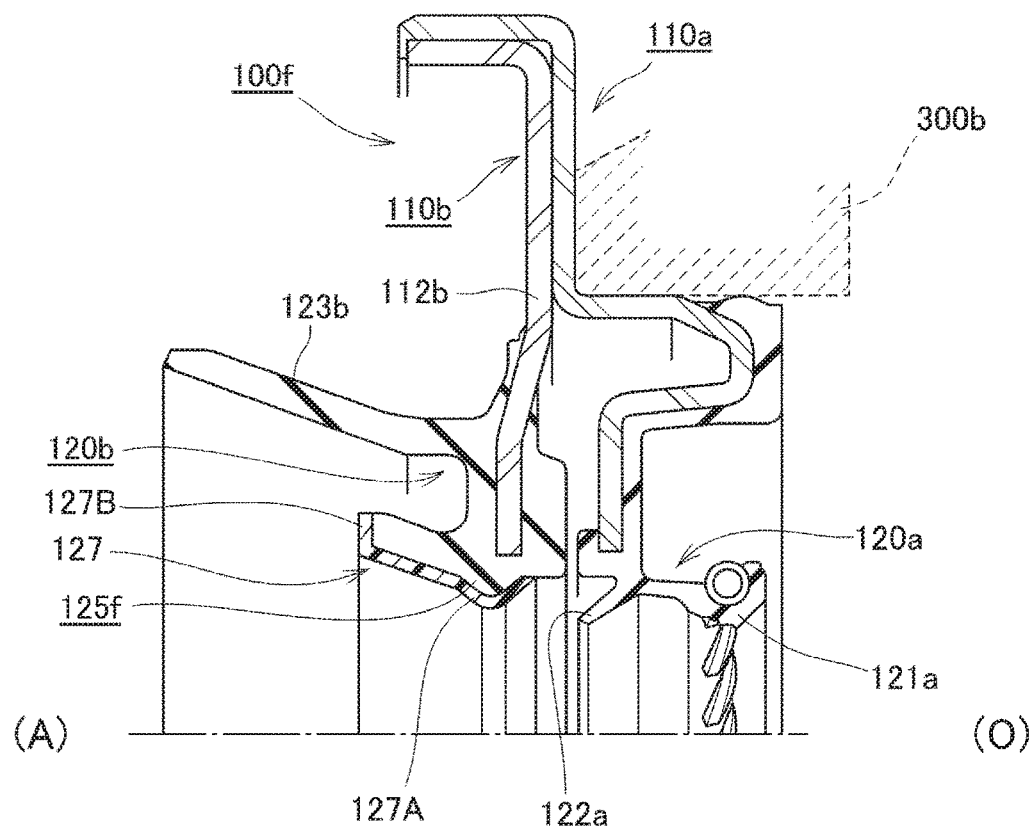
FIG. 9 is a schematic cross-sectional view of a sealing device according to Example 7 of the present disclosure.

FIG. 9 shows Example 7 of the present disclosure. The configuration of a sealing device according to the present Example is similar to that of the sealing device 100b according to Example 3 described above, but is different from that of the case of Example 3 in that the guide made of resin is provided in the bumper portion provided in the rubber-like elastic body portion 120b. Consequently, hereinbelow, only the configuration different from that of the case of Example 3 will be described. Note that the same constituent parts as those of the sealing device 100b according to Example 3 are designated by the same reference numerals as those in Example 3, and the description thereof will be omitted.

FIG. 9 is a cross-sectional view of the sealing device according to Example 7 of the present disclosure. Note that FIG. 9 shows a cross section of the sealing device obtained by cutting by using the plane including the central axis in the sealing device. A sealing device 100f according to the present Example also plays the role in sealing the annular gap between the shaft and the housing 300b. In the sealing device 100f as well, the right side in the drawing corresponds to the sealed area side (O) in which the target liquid to be sealed is sealed, and the left side in the drawing corresponds to the air side (A) opposite to the sealed area when the sealing device 100f is used. Note that, in FIG. 9, the shaft is not shown, and the housing 300b is depicted by using a dotted line.

In addition, similarly to the sealing device 100b according to Example 3 described above, the sealing device 100f according to the present Example includes the metal reinforcing ring 110a, the seal main body 120a made of the rubber-like elastic body that is provided integrally with the reinforcing ring 110a, and the auxiliary reinforcing ring 110b that is fixed to the reinforcing ring 110a by fitting. The configurations of the reinforcing ring 110a and the seal main body 120a are the same as those of the case of Example 3 described above. In addition, the configuration of the auxiliary reinforcing ring 110b is basically the same as that of the case of Example 3 described above, but the configuration related to the bumper portion of the rubber-like elastic body portion 120b is different from that of the case of Example 3. Consequently, hereinbelow, only the configuration different from that of the case of Example 3 will be described.

The rubber-like elastic body portion 120b integrally has the side lip 123b and a bumper portion 125f. Similarly to the bumper portion 125b of the sealing device 100b according to Example 3, the bumper portion 125f is provided in the vicinity of the tip of the inward flange portion 112b, and plays the role in reducing the impact that the dust lip 122a receives from the shaft when the shaft is inserted into the sealing device 100f. Similarly to the bumper portion 125b according to Example 3, the bumper portion 125f is constituted by the lip-shaped part that extends from the position located inwardly of the tip of the inward flange portion 112b in the radial direction to the air side (A) outwardly in the radial direction. In addition, the guide 127 made of PTFE is provided on the inner peripheral side and the air side (A) of the bumper portion 125f. The guide 127 is bonded to the bumper portion 125f, and is constituted by the inner peripheral portion 127A that covers the inner peripheral side of the bumper portion 125f and the radial portion 127B that covers the air side (A) of the bumper portion 125f (the air side (A) in the lip-shaped part). The dimensional relationship among the inner diameter of the tip of the guide 127 on the inner peripheral side, the outer diameter of the large diameter portion 220 of the shaft 200, and the inner diameter of the part having the largest inner diameter in the portion that connects the main lip 121a and the dust lip 122a is the same as that of the case of Example 5 or 6 described above.

In the thus configured sealing device 100f as well, it is possible to obtain the same effects as those of the case of Example 5 described above. Note that, in the case of the sealing device 100f, the inner peripheral side of the lip-shaped part in the bumper portion 125f that extends to the air side (A) and outwardly in the radial direction is covered with the inner peripheral portion 127A of the guide 127, and the air side (A) of the lip-shaped part is covered with the radial portion 127B of the guide 127. With this, when the shaft hits the guide 127 at the time of insertion of the shaft into the sealing device 100f, the function of guiding the shaft in the direction in which the central axis of the shaft matches the central axis of the sealing device 100f is exerted more effectively.

Example 8

Figure 10:
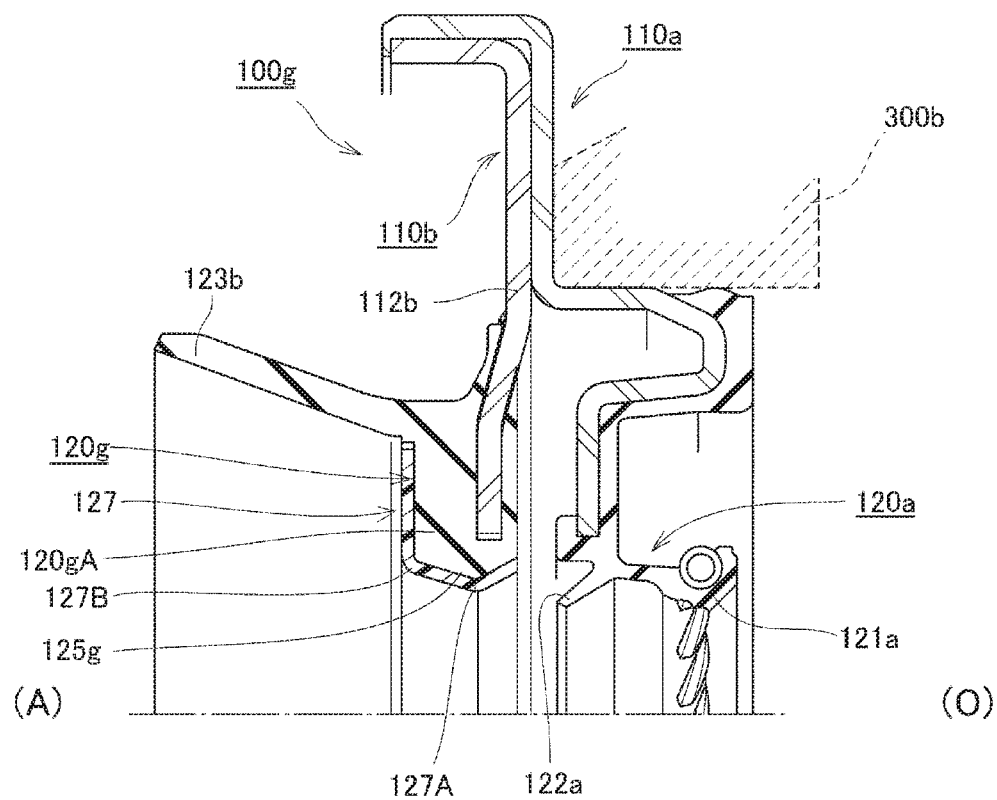
FIG. 10 is a schematic cross-sectional view of a sealing device according to Example 8 of the present disclosure.

FIG. 10 shows Example 8 of the present disclosure. The configuration of a sealing device according to the present Example is similar to that of the sealing device 100c according to Example 4 described above, but is different from that of the case of Example 4 in that the guide made of resin is provided in the bumper portion provided in the rubber-like elastic body portion 120c. Consequently, hereinbelow, only the configuration different from that of the case of Example 4 will be described. Note that the same constituent parts as those of the sealing device 100c according to Example 4 are designated by the same reference numerals as those in Example 4, and the description thereof will be omitted.

FIG. 10 is a schematic cross-sectional view of the sealing device according to Example 8 of the present disclosure. Note that FIG. 10 shows a cross section of the sealing device obtained by cutting by using the plane including the central axis in the sealing device. A sealing device 100g according to the present Example also plays the role in sealing the annular gap between the shaft and the housing 300b. In the sealing device 100g as well, the right side in the drawing corresponds to the sealed area side (O) in which the target liquid to be sealed is sealed, and the left side in the drawing corresponds to the air side (A) opposite to the sealed area when the sealing device 100g is used. Note that, in FIG. 10, the shaft is not shown, and the housing 300b is depicted by using a dotted line.

Similarly to the sealing device 100c according to Example 4 described above, the sealing device 100g according to the present Example includes the metal reinforcing ring 110a, the seal main body 120a, the auxiliary reinforcing ring 110b, and a rubber-like elastic body portion 120g that is provided in the auxiliary reinforcing ring 110b. The configurations of the reinforcing ring 110a, the seal main body 120a, and the auxiliary reinforcing ring 110b are the same as those of the case of Example 4 described above. The configuration of the rubber-like elastic body portion 120g is basically the same as that of the rubber-like elastic body portion 120c in Example 4 described above, but the configuration related to the bumper portion is different from that of the case of Example 4. Consequently, hereinbelow, only the configuration different from that of the case of Example 4 will be described.

In the rubber-like elastic body portion 120g of the sealing device 100g according to the present Example, a thick portion 120gA is provided on the air side (A) of the inward flange portion 112b. In addition, the inner peripheral portion of the thick portion 120gA is constituted by a bumper portion 125g and, further, the guide 127 made of PTFE is provided on the inner peripheral side and the air side (A) of the bumper portion 125g. Note that the guide 127 is bonded to the rubber-like elastic body portion 120g, and is constituted by the inner peripheral portion 127A that covers the inner peripheral side of the bumper portion 125g, and the radial portion 127B that covers the air side (A) of the bumper portion 125g. Note that the radial portion 127B also covers the air side (A) of the thick portion 120gA of the rubber-like elastic body portion 120g. The dimensional relationship among the inner diameter of the tip of the guide 127 on the inner peripheral side, the outer diameter of the large diameter portion 220 of the shaft 200, and the inner diameter of the part having the largest inner diameter in the portion that connects the main lip 121a and the dust lip 122a is the same as that of the case of each of Examples 5 to 7 described above.

In the thus configured sealing device 100g as well, it is possible to obtain the same effects as those of the case of Example 5 described above. Note that, in the case of the sealing device 100g, the air side (A) of the thick portion 120gA of the rubber-like elastic body portion 120g is also covered with the radial portion 127B of the guide 127. With this, even when the position of the shaft is greatly displaced in the radial direction at the time of insertion of the shaft into the sealing device 100g (even when a large misalignment occurs), the tip of the shaft hits the radial portion 127B, and hence the bumper portion 125g and the thick portion 120gA are prevented from being damaged.

In Examples 5 to 8 as well, although not shown in the drawing, the metal slinger may be mounted to the shaft similarly to the case of Example 1 described above, and the side lip 123b in each sealing device may be configured to slidably come into contact with the outward flange portion in the slinger. With this, even in the environment in which muddy water or the like splashes, it is possible to prevent the intrusion of the foreign object to the sealed area side (O).

Reference Examples

In each of Examples described above, the bumper portion for reducing the impact that the dust lip receives from the inserted shaft is provided. In contrast to this, in Reference Examples described below, a guide for guiding the inserted shaft in the direction in which the central axis of the shaft matches the central axis of the sealing device is provided instead of the bumper portion. With this, even when the position of the shaft is displaced in the radial direction at the time of insertion of the shaft, the tip of the shaft is prevented from hitting the dust lip and the main lip, and hence the turnover of the dust lip and the damage to the dust lip and the main lip are prevented.

Figure 11:
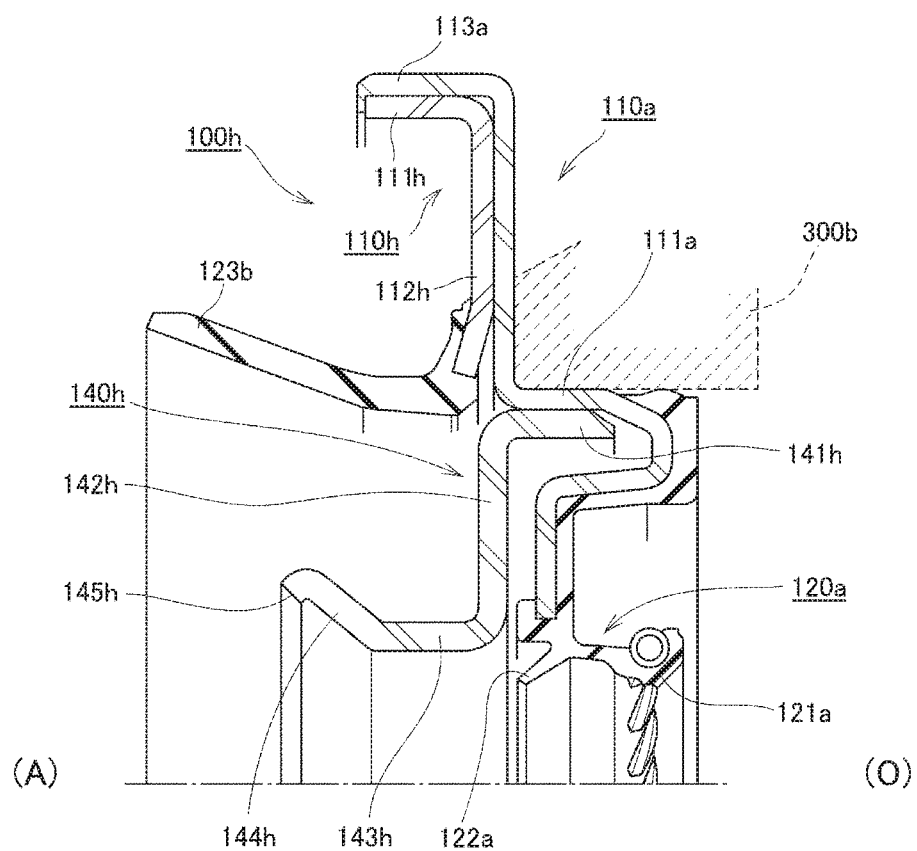
FIG. 11 is a schematic cross-sectional view of a sealing device according to Reference Example 1 of the present disclosure.
Figure 12:
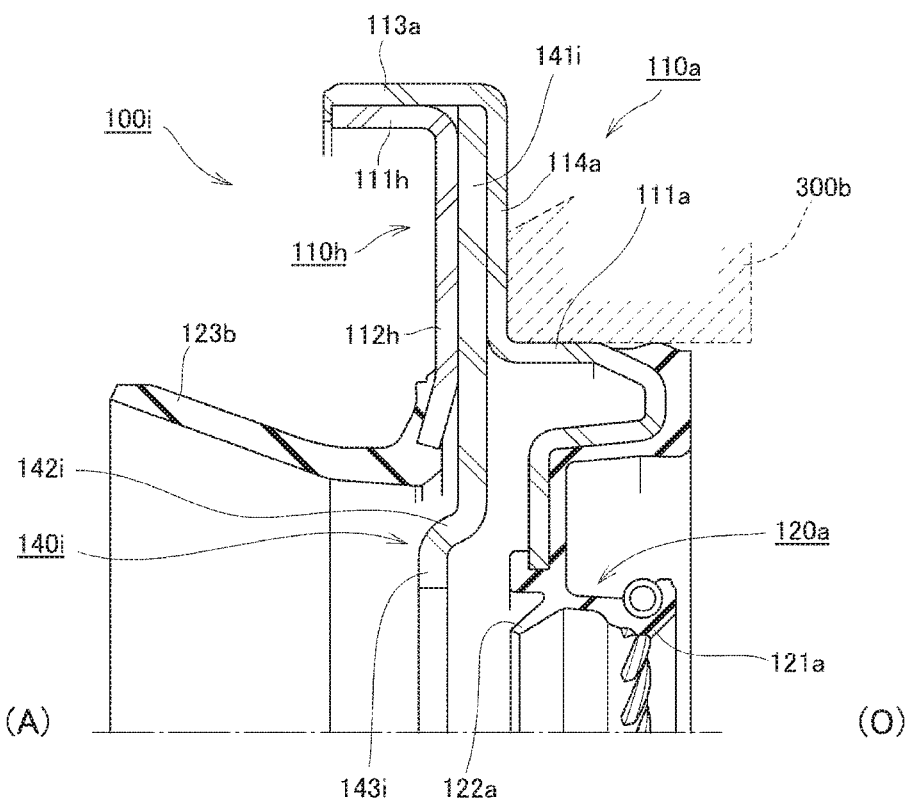
FIG. 12 is a schematic cross-sectional view of a sealing device according to Reference Example 2 of the present disclosure.
Figure 13:
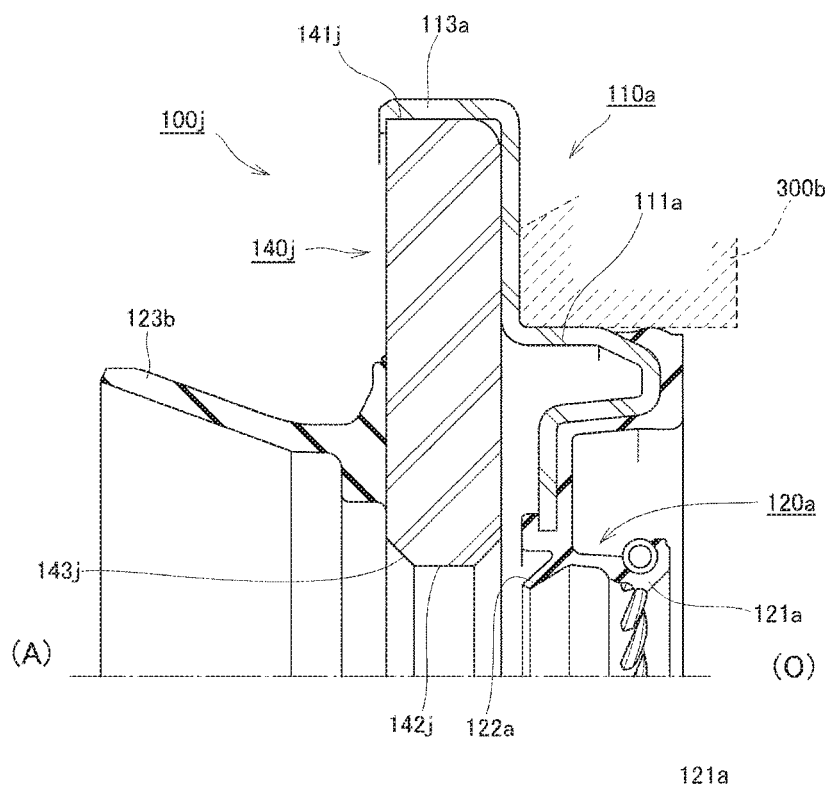
FIG. 13 is a schematic cross-sectional view of a sealing device according to Reference Example 3 of the present disclosure.
Figure 14:
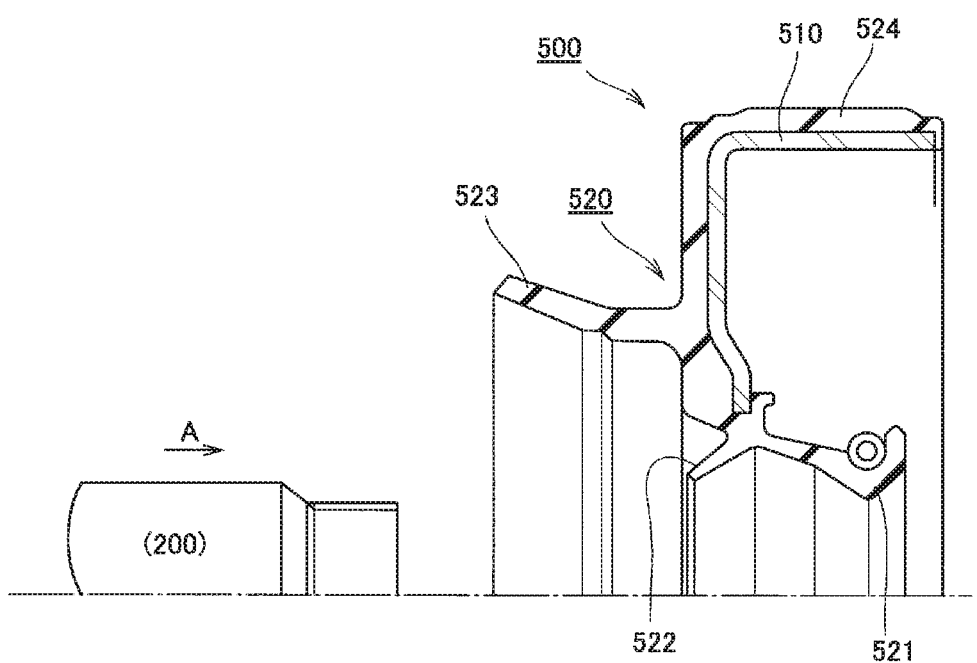
FIG. 14 is a schematic cross-sectional view of a sealing device according to a conventional example.

FIGS. 11, 12, and 13 are schematic cross-sectional views of sealing devices according to Reference Examples 1, 2, and 3, respectively. Note that each of FIGS. 11 to 13 shows a cross section of the sealing device obtained by cutting by using the plane including the central axis in the sealing device. As shown in each of FIGS. 11 to 13, in the sealing device according to each of Reference Examples as well, similarly to the case of each of Examples described above, the right side in the drawing corresponds to the sealed area side (O) in which the target liquid to be sealed is sealed, and the left side in the drawing corresponds to the air side (A) opposite to the sealed area when the sealing device is used. Similarly to the case of Example 3 described above, the sealing device according to each of Reference Examples also includes the metal reinforcing ring 110a and the seal main body 120a made of the rubber-like elastic body that is provided integrally with the reinforcing ring 110a. However, unlike Example 3 described above, each of Reference Examples includes the guide for guiding the inserted shaft instead of the bumper portion. Hereinbelow, Reference Examples will be described sequentially. Note that the same constituent parts as those in Example 3 described above are designated by the same reference numerals as those in Example 3, and the description thereof will be omitted.

As shown in FIG. 11, a sealing device 100h according to Reference Example 1 includes an auxiliary reinforcing ring 110h that is fixed to the reinforcing ring 110a by fitting. The auxiliary reinforcing ring 110h includes a cylindrical portion 111h that is fitted in the inner peripheral surface of the fitting portion 113a of the reinforcing ring 110a, and a flange portion 112h that extends from the end portion of the cylindrical portion 111h on the sealed area side (O) inwardly in the radial direction. In addition, the side lip 123b that extends from the tip of the flange portion 112h to the air side (A) is provided integrally with the auxiliary reinforcing ring 110h.

Further, the sealing device 100h includes a guide 140h that is fixed to the reinforcing ring 110a by fitting. The annular guide 140h includes a cylindrical portion 141h that is fitted in the inner peripheral surface of the cylindrical portion 111a of the reinforcing ring 110a, and a flange portion 142h that extends from the end portion of the cylindrical portion 141h on the air side (A) inwardly in the radial direction. Furthermore, the guide 140h includes a cylindrical portion 143h that extends from the tip of the flange portion 142h on the inner peripheral side to the air side (A), and an increased diameter portion 144h that extends from the end portion of the cylindrical portion 143h on the air side (A) to the air side (A) while increasing its diameter. Herein, the inner diameter of the cylindrical portion 143h is set to be larger than the outer diameter Y1 of the large diameter portion 220 of the shaft 200 (see FIG. 2). In addition, at the end portion of the increased diameter portion 144h on the air side (A), a tapered surface 145h of which the diameter is increased with approach to the air side (A) is formed.

According to the thus configured sealing device 100h, even when the position of the shaft 200 is displaced in the radial direction at the time of insertion of the shaft 200 into the sealing device 100h, the tip of the shaft 200 hits the inner peripheral surface of the increased diameter portion 144h. With this, the inserted shaft 200 is guided in the direction in which the central axis of the shaft 200 matches the central axis of the sealing device 100h. As a result, the tip of the shaft 200 is prevented from hitting the dust lip 122a and the main lip 121a, and hence the turnover of the dust lip 122a and the damage to the dust lip 122a and the main lip 121a are prevented. Further, according to sealing device 100, since the tapered surface 145h of which the diameter is increased with approach to the air side (A) is formed at the end portion of the increased diameter portion 144h on the air side (A), the inserted shaft 200 is smoothly guided in the direction in which the central axis thereof matches the central axis of the sealing device 100h.

FIG. 12 shows a sealing device 100i according to Reference Example 2 of the present disclosure. In the present Reference Example, the shape of the guide is different from that in Reference Example 1 described above. As shown in FIG. 12, the sealing device 100i includes a guide 140i that is fixed to the reinforcing ring 110a by the auxiliary reinforcing ring 110h. The annular guide 140i includes a radial portion 141i having an outer diameter substantially equal to the inner diameter of the fitting portion 113a of the reinforcing ring 110a, and is fixed so as to be positioned in an axial direction and the radial direction by being held between the reinforcing ring 110a and the auxiliary reinforcing ring 110h fitted in the reinforcing ring 110a in a state in which the annular guide 140i is accommodated in the fitting portion 113a. In addition, the guide 140i includes a curved portion 142i that is curved from the tip of the radial portion 141i on the inner peripheral side to the air side (A), and a radial portion 143i that extends from the end portion of the curved portion 142i on the air side (A) inwardly in the radial direction. Herein, the inner diameter of the radial portion 143i is set to be larger than the outer diameter Y1 of the large diameter portion 220 of the shaft 200 (see FIG. 2). Consequently, even when the position of the shaft 200 is displaced in the radial direction at the time of insertion of the shaft 200 into the sealing device 100i, the tip of the shaft 200 comes into contact with the radial portion 143i. With this, the inserted shaft 200 is guided in the direction in which the central axis thereof matches the central axis of the sealing device 100i. As a result, in the sealing device 100i as well, it is possible to obtain the same effects as those of the case of Reference Example 1 described above. Note that the tapered surface of which the diameter is increased with approach to the air side (A) may also be formed at the end portion of the radial portion 143i on the inner peripheral side.

FIG. 13 shows a sealing device 100j according to Reference Example 3 of the present disclosure. In the present Reference Example, the shape of the guide is different from that in each Reference Example described above, and the auxiliary reinforcing ring is not provided. As shown in FIG. 13, the sealing device 100j includes a guide 140j that is fixed to the reinforcing ring 110a by fitting. The annular guide 140j includes an outer peripheral surface 141j that is fitted in the inner peripheral surface of the fitting portion 113a of the reinforcing ring 110a. In addition, the guide 140j includes an inner peripheral surface 142j having an inner diameter larger than the outer diameter Y1 of the large diameter portion 220 of the shaft 200 (see FIG. 2), and a tapered surface 143j of which the diameter is increased with approach to the air side (A) is formed on the air side (A) of the inner peripheral surface 142j. Consequently, even when the position of the shaft 200 is displaced in the radial direction at the time of insertion of the shaft 200 into the sealing device 100j, the tip of the shaft 200 comes into contact with the tapered surface 143*j* of the guide 140*j*. With this, the inserted shaft 200 is guided in the direction in which the central axis thereof matches the central axis of the sealing device 100*j*. As a result, in the sealing device 100*j* as well, it is possible to obtain the same effects as those of the case of each Reference Example described above. Note that the side lip 123*b* that extends to the air side (A) is provided integrally with the end surface of the guide 140*j* on the air side (A).

In each of Reference Examples as well, although not shown in the drawing, the metal slinger may be mounted to the shaft similarly to the case of Example 1 described above, and the side lip 123*b* in each sealing device may be configured to slidably come into contact with the outward flange portion in the slinger. With this, even in the environment in which muddy water or the like splashes, it is possible to prevent the intrusion of the foreign object to the sealed area side (O).

REFERENCE SIGNS LIST

100,100*a*,100*b*,100*c*,100*d*,100*e*,100*f*,100*g*,100*h*,100*i*,100*j*: sealing device
110,110*a*: reinforcing ring
110*b*: auxiliary reinforcing ring
111,111*a*,111*b*: cylindrical portion
112,112*a*,112*b*: inward flange portion
113*a*: fitting portion
120,120*a*: seal main body
120A: thick portion
120*b*,120*c*,120*d*: rubber-like elastic body portion
120*c*A,120*d*A: thick portion
121,121*a*: main lip
122,122*a*: dust lip
123,123*b*: side lip
124,124*a*: outer peripheral seal portion
125,125*a*,125*b*,125*c*,125*d*: bumper portion
126,126*a*: screw portion
127: guide
130: spring
140*h*,140*i*,140*j*: guide
200: shaft
210: small diameter portion
220: large diameter portion
300,300*b*: housing
400: slinger
410: cylindrical portion
420: outward flange portion

The invention claimed is:

1. A sealing device sealing an annular gap between a shaft and a housing, comprising:
a reinforcing ring having an inward flange portion; and
a seal main body made of a rubber-like elastic body, provided integrally with the reinforcing ring, and having a main lip that extends from a vicinity of a tip of the inward flange portion to a sealed area side, and slidably comes into contact with an outer peripheral surface of the shaft, and a dust lip that extends from the vicinity of the tip of the inward flange portion to a side opposite to the sealed area, and slidably comes into contact with the outer peripheral surface of the shaft, wherein
a bumper portion made of a rubber-like elastic body and reducing an impact that the dust lip receives from the shaft when the shaft is inserted into the sealing device is provided on the side of the dust lip opposite to the sealed area, and an inner diameter of a tip of the bumper portion on an inner peripheral side is set to be larger than an outer diameter of a part of the shaft on which the main lip and the dust lip slide and to be smaller than an inner diameter of a part having the largest inner diameter in a portion connecting the main lip and the dust lip.

2. A sealing device sealing an annular gap between a shaft and housing, comprising:
a reinforcing ring having an inward flange portion; and
a seal main body made of a rubber-like elastic body, provided integrally with the reinforcing ring, and having a main lip that extends from a vicinity of a tip of the inward flange portion to a sealed area side, and slidably comes into contact with an outer peripheral surface of the shaft, and a dust lip that extends from the vicinity of the tip of the inward flange portion to a side opposite to the sealed area, and slidably comes into contact with the outer peripheral surface of the shaft, wherein
a bumper portion made of a rubber-like elastic body and reducing an impact that the dust lip receives from the shaft when the shaft is inserted into the sealing device is provided on the side of the dust lip opposite to the sealed area, and a guide made of resin and guiding the shaft into the sealing device is provided on an inner peripheral side of the bumper portion on the side opposite to the sealed area, and an inner diameter of a tip of the guide on the inner peripheral side is set to be larger than an outer diameter of a part of the shaft on which the main lip and the dust lip slide and to be smaller than an inner diameter of a part having the largest inner diameter in a portion connecting the main lip and the dust lip.

3. The sealing device according to claim 1, wherein the bumper portion is constituted by part of the seal main body.

4. The sealing device according to claim 3, wherein the seal main body is provided with a thick portion on the side of the inward flange portion opposite to the sealed area, and an inner peripheral side of the thick portion is constituted by the bumper portion.

* * * * *